United States Patent [19]

Chen

[11] Patent Number: 4,868,883
[45] Date of Patent: Sep. 19, 1989

[54] ANALYSIS OF THIN SECTION IMAGES
[75] Inventor: Patrick C. Chen, Houston, Tex.
[73] Assignee: Exxon Production Research Company, Houston, Tex.
[21] Appl. No.: 195,424
[22] Filed: May 10, 1988

Related U.S. Application Data

[63] Continuation of Ser. No. 814,697, Dec. 30, 1985, abandoned.

[51] Int. Cl.$^4$ .............................................. G06K 9/00
[52] U.S. Cl. ......................................................... 382/1
[58] Field of Search ................... 382/1, 16, 17, 28, 36; 364/416, 518, 526; 250/307, 310, 311; 358/22, 30, 28, 40, 80; 356/378, 379, 380, 402

[56] References Cited

U.S. PATENT DOCUMENTS

| | | | |
|---|---|---|---|
| 2,891,722 | 6/1959 | Nuttall et al. | 235/92 |
| 3,504,975 | 4/1970 | White | 356/308 |
| 3,790,704 | 2/1974 | Collomosse et al. | 178/6.8 |
| 4,115,803 | 9/1978 | Morton | 382/28 |
| 4,191,940 | 3/1980 | Polcyn | 382/17 |
| 4,278,538 | 7/1981 | Lawrence | 356/405 |
| 4,424,530 | 1/1984 | Taylor | 358/96 |
| 4,481,529 | 11/1984 | Kerling | 358/37 |
| 4,503,555 | 3/1985 | Brimhall, Jr. et al. | 382/61 |
| 4,628,468 | 12/1986 | Thompson | 364/556 |
| 4,783,751 | 11/1988 | Chen | 364/506 |

FOREIGN PATENT DOCUMENTS

WO85/00892  2/1985  PCT Int'l Appl. .

OTHER PUBLICATIONS

Chen et al. "Image Segmentation as an Estimation Problem" (1980).
Crabtree et al. "Evaluation of Strategies for Segmentation of Blue-dyed Pores in Thin Sections of Reservoir Rocks" (1984).

Primary Examiner—Leo H. Boudreau
Assistant Examiner—Jose L. Couso
Attorney, Agent, or Firm—Keith A. Bell

[57] ABSTRACT

A system for analyzing thin section images is disclosed. A microscope scans a thin section impregnated by a dyed epoxy and develops a digital representation of the color image of the thin section. A classifier defines the areas of the image which are identified as pore space. The color image is then transformed into a monochromatic image by transforming the color image onto the principal axis representing the brightness of the color image. Each discrete feature representing grain space or pore space in the monochromatic image is defined by analyzing the uniform brightness distribution of the region. Finally, the boundary of each discrete region can be processed to ascertain the size, shape, orientation and roundness of the region.

7 Claims, 1 Drawing Sheet

ANALYSIS OF THIN SECTION IMAGES

CROSS REFERENCE TO RELATED APPLICATION

This application is a continuation of patent application Ser. No. 814,697, filed Dec. 30, 1985, now abandoned.

FIELD OF THE INVENTION

The present invention relates to the analysis of images of a thin section sample. More particularly, the invention relates to a method and system for analyzing the discrete features of thin sections prepared from geologic samples and other porous compounds.

BACKGROUND OF THE INVENTION

Thin sections of geologic samples less than 60 μm thick are customarily examined with petrographic image analysis techniques to study the micro-features of the sample. From the analysis, geological interpretations of the depositional and post-depositional processes which formed the sample can be derived. Moreover, physical qualities such as the porosity and permeability of the sample can be measured. For example, the porosity of a sample is estimated from the percentage of pore space in the image area. The permeability of the sample, which depends on an interconnected network of individual pores, can be estimated from the porosity of the sample by a linear regression formula or by the Kozeny-Carman equation.

The manual analysis of thin section images is termed point counting. In this technique, a technician reviews the magnified image of a thin section and classifies the features of the pore space and mineral grains in the image. Because point counting is labor-intensive, tedious, and is subject to errors by the technician, various techniques have been proposed to automate the processing of thin section images. Many of these techniques are based on thresholding. To apply thresholding techniques, a scanning electron microscope scans a sample and assesses the backscattered electrons from the sample to determine the brightness of each pixel in the field of view. Next, an image of the thin section is prepared and is represented by a matrix of pixels. Each pixel in the matrix is classified as either pore space or grain space by comparing the brightness of the pixel to a selected threshold level. Thresholding techniques are based on the assumption that all pixels brighter than the threshold value are part of the grain space, and all pixels darker than the threshold value are part of the pore space.

The accuracy of thresholding techniques is limited by several factors. The threshold value is determined by trial and error and may not accurately separate pore space from the grain space in the sample. If the sample contains dark grains which reflect or transmit less light than the pore space, the thresholding technique may erroneously classify the dark or non-reflecting grains as pore space. If the thin section is backlit during the analysis, certain grains in the sample may appear darker than the pore space due to polarization effects of the light as it is transmitted through the thin section. Moreover, the data furnished by thresholding techniques is limited because the pixels are not correlated with adjacent pixels. Additional processing is required to ascertain the qualitative factors represented by the image of the thin section.

A need exists for a method and system which efficiently analyzes the discrete features of a thin section. The method and system should be applicable to the micro-analysis of geologic samples and other porous compounds.

SUMMARY OF THE INVENTION

The present invention furnishes a method and system for analyzing the features of a porous solid. First, data is generated which forms a digital representation of the solid. Next, the digital representation is arranged into an array of pixels which represents a color image of the solid. The digital representation is processed to define those pixels identified as pore space, and the digital representation of the color image is transformed onto its principal axis to generate a monochromatic image. The monochromatic image is then processed to define the boundary of each discrete feature within the image. After the discrete features of the image have been segregated, the geometry of each feature and the distribution of the features can be analyzed.

DESCRIPTION OF THE PREFERRED EMBODIMENTS

Figure 1:
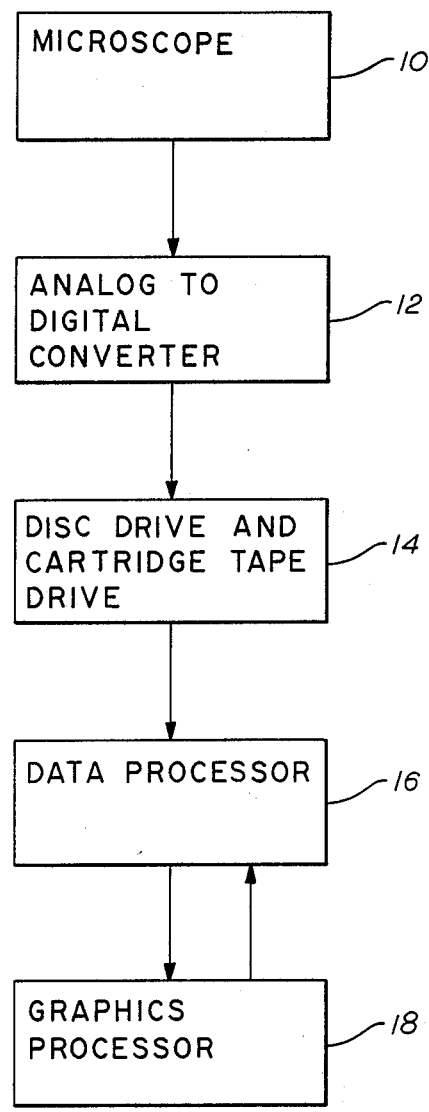
FIG. 1 is a schematic diagram showing an embodiment of the system described by the present invention.

The present invention may be used to prepare and analyze the image of a solid such as a sedimentary rock which has been impregnated by a pigmented dye. First, a color image of the rock is developed and the pore space is separated from the grains by applying a statistical pattern classification technique to the color image. Next, the color image is transformed into a monochromatic image by projecting the color image onto its principal axis. A segmentation algorithm based upon brightness variations in the image is then applied to the monochrome image to identify individual grains in the image. Finally, a grain analysis to estimate size, sorting, orientation, elongation, and roundness of the grains can be performed.

Thin sections of a geologic sample are prepared by impregnating a blue epoxy or other dyed compound into the pores of the sample. Blue dye is customarily used because few mineral grains reflect the wavelengths associated with the color blue. After a thin section has been prepared from the sample, the thin section is illuminated to more clearly define the features of the pores and grains in the rock. A microscope magnifies the thin section to facilitate the resolution of the features. A color image of the rock is developed by digitizing an analog signal representing an electronic image of the thin section. Referring to block 10 in FIG. 1, a microscope develops an analog signal representing a time varying voltage which is proportional to scene brightness. Each analog signal is then converted into a digital signal with analog-to-digital converter 12. The resulting digital signals are electronically arranged into an array of grid points or pixels and stored in disk and tape drive 14. The digital signals can be manipulated by computer programs which are executed by data processor 16.

Graphics processor 18, which interactively communicates with data processor 16, displays the data generated by data processor 16. For a digital color image, three values representing the intensity of the red (R), green (G), or blue (B) tristimuli are associated with each pixel. Mathematically, each pixel can be expressed as a point in three-dimensional RGB space. A color image can be displayed on graphics processor 18 by combining the three digitized images taken through red, green, and blue filters.

After the color image has been prepared, the pore space is defined. In point counting procedures, an observer manually counts the areas that show the blue dye which impregnates the rock. As previously discussed, automated thresholding techniques have been developed because of the undesireability of manual point-counting techniques. Although automated thresholding techniques distinguish pore space by analyzing a monochromatic blue image of the sample, these techniques cannot discriminate pore space from black grains in the sample. Moreover, thresholding techniques cannot accurately assess samples containing certain types of minerals. For example, the blue component of minerals such as quartz may be more intense than the blue image of the pore space. Therefore, thresholding techniques which analyze a monochromatic blue image may assign a higher value of porosity to a sample than is justified.

The present invention avoids the errors associated with thresholding techniques by applying a statistical pattern classification technique to the color image. Preferably, a quadratic Bayes classifier or a linear classifier identifies the pore space from the grain space. As set forth herein, grain space is defined as any feature in the sample other than pore space. The grain space may include mineral grains and various compounds which cement the mineral grains into an agglomerate. Data from the sample is programmed into the classifier by using a cursor or light pen (not shown) to sample representative features of the sample's pore space and grain space. The classifier then processes the data in the color image to separate the pore space from the grain space. The pore space can then be displayed on graphics processor 18. Although the quadratic form of a Bayes classifier minimizes the error in classifying the pore space, a linear classifier will perform the measurements with less computing time. The classification error, defined as the quotient of the number of misclassified pixels divided by the total number of pixels in the image, can be determined using techniques well-known in the art. For a quadratic Bayes classifier, the classification error for defining the pore space from the grain space has been calculated at less than five percent.

The porosity of the rock can be analyzed after the pore space has been segmented from the grain space in the sample. The porosity can be estimated by dividing the number of pixels identified as pore space by the total number of pixels in the array. Because the pores are detected by the presence of blue epoxy impregnated in the sample, the porosity more closely measures the effective or interconnected porosity rather than the absolute porosity of the sample. As is well-known in the art, the pore complex in a sample represents the time-integrated interaction between the initial properties of a sedimentary deposit and the post-depositional chemical and physical processes which occur. The pore geometry represented in the two dimensional image can be used to estimate parameters of the rock sample. For a sample which is taken from a hydrocarbon bearing reservoir, parameters such as permeability, initial water saturation and residual oil saturation can be estimated by a sedimentary petrographer.

After the pore space has been segregated from the grain space in the rock, the present invention analyzes the discrete features of the pore space and grain space by defining the two dimensional geometry of each individual feature. To accomplish this, the color image developed by microscope 10 is transformed into a monochromatic image by projecting the color image onto its principal axis. This transformation eliminates redundant data in the three dimensional RGB space and significantly reduces the data processing time required to analyze a given image. This transformation is accomplished by a linear transform which projects the color image onto the principal axis representative of the brightness of the color image. The mathematical basis for the transformation is described below.

In a color image with M X M pixels, each pixel (i,j) is a vector of $\bar{P}(i,j)$ in the RGB space that can be linearly transformed into $\bar{P}'(i,j)$ in a new space. That is, $$P'(i,j) = V^T P(i,j)$$

where $V = [q_1 \; q_2 \; q_3]$.

The matrix $\overline{V}$ satisfies the equation $$V^T S V = E$$

where $\bar{S}$ is a brightness autocorrelation matrix defined as $$S = \frac{1}{M^2} \sum_{i=1}^{M} \sum_{j=1}^{M} P(i,j) P^T(i,j)$$

and $$E = \begin{vmatrix} \lambda_1 & 0 & 0 \\ 0 & \lambda_2 & 0 \\ 0 & 0 & \lambda_3 \end{vmatrix}$$

Each column vector $\bar{q}_i$ of $\overline{V}$ is a normalized eigenvector of $\bar{S}$, and $\lambda_i$ is the eigenvalue of $\bar{S}$ with the eigenvector $\bar{q}_i$.

Assuming that $\lambda_1 \geq \lambda_2 \geq \lambda_3$, $\bar{q}_1$ is the principal axis, $\bar{q}_2$ is the second axis, and $\bar{q}_3$ is the third axis. Therefore, the eigenvector $\bar{q}_1$ will be dominant due to its larger eigenvalue $\lambda_1$ and will represent most of the information present in the color image. By transforming the color image onto the $\bar{q}_1$ axis, the resulting monochromatic image will reduce the amount of redundant data contained in the image while retaining the optimal amount of data represented in the color image.

Experimental results obtained by using the present invention indicate that the principal axis is analogous to the axis which represents the brightness of the image. Results computed from this analysis validate published tests of the human visual coordinate system which have studied the principal axes of brightness, hue, and saturation. As noted in the analysis of photographic scenes and astronomical images, the results suggest that the brightness axis can be considered to approximate the principal axis of a color image. This finding is utilized by the present invention to simplify the analysis of discrete features in the image by transforming the color image to a monochromatic image.

After the color image of the rock sample has been transformed into a monochromatic image, the resulting image is processed to segment the discrete features of the image. The segmentation is accomplished with a split-and-merge algorithm which recursively divides the monochrome image until the image is composed of bounded regions which have a uniform brightness. Assuming that the brightness values of all image points within a discrete, uniform region follow a Gaussian distribution, the definition of "uniform brightness" is based on a threshold below which the difference between two regions is not apparent to the human eye.

One split-and-merge algorithm which can segment the monochromatic image into regions of uniform brightness is described by P. C. Chen and T. Pavlidis in *Image Segmentation as an Estimation Problem* (1980). As described by Chen and Pavlidis, an algorithm first partitions the monochromatic image into equal-size regions which are tested for uniformity within the region. If a region is not uniform, the algorithm divides the region into four smaller regions and recursively tests each of the smaller regions for uniformity. This procedure is repeated until the entire image is partitioned into a plurality of differently sized regions which each have a uniform brightness distribution. The algorithm then searches each set of four adjacent, equal-sized regions and tests the regions for uniformity. If the set of adjacent, equal-size regions is uniform, the regions are merged. Next, the algorithm groups all adjacent regions of a different size which are classified as having the same uniform brightness. After all adjacent regions of a uniform brightness have been combined to form merged regions of a uniform distribution, the algorithm interpolates between the regions to define the boundary of each discrete, merged region. An identification number is then assigned to each discrete, merged region. Assuming that each discrete feature in a sample will have a uniform brightness distribution across the feature, each merged region will represent a discrete grain space or pore space in the image.

After the boundaries of each discrete feature have been defined, a detailed analysis of each grain or pore space can be performed. For example, the analysis might evaluate the size, shape, orientation, and roundness of the grain or pore space. As previously stated, the analysis of the pore spaces may yield information related to the porosity and permeability of the sample. Because a geologic sample such as a sedimentary rock comprises grains of different sizes and mineral content, a detailed analysis of the grains can furnish information related to the depositional history of the sediment and the postdepositional processes which formed the rock.

The size of a grain can be computed once the region boundary has been established by counting the number of pixels within the grain boundary. Subsequently, the grain size distribution and the mean, standard deviation, and skewness of the grains can be computed. The mean, or average value of the grain size is important because the average grain size in a sedimentary rock decreases as the distance from the sediment source increases. By analyzing trends in grain size over a region, the direction of sediment dispersal can be determined. The standard deviation indicates the effectiveness of the depositional medium in separating grains of different sizes. Both the average grain size and the sorting are significant factors in determining the permeability of a sedimentary rock. The skewness is a measure of the symmetry of the grain size distribution and reflects other factors related to the depositional process.

The shape of a grain is typically classified by the elongation and orientation of the grain. The elongation of the grain can be mathematically derived from a second inertial moment matrix. The orientation of grains in a sample can be plotted on a polar histogram to compute the projected direction of the dominant paleocurrent.

Grain roundness concerns the sharpness of corners and edges of grains and yields clues regarding the diagenesis of rock fragments. The grain roundness is frequently determined by manual classification techniques which depend on a defined set of guidelines. Alternatively, grain roundness can be estimated by a simple pattern recognition technique. For example, two-dimensional figures such as circles, ellipses, or triangles can be assigned to each feature delineated in the grain image. To achieve a significantly more accurate approximation, the roundness of each grain can be determined with an algorithm which first reduces the discrete effect of the boundary by polygonal approximation. Next, the radius of a circle is computed which circumscribes the boundary of the grain with minimal radius. Finally, the grain boundary is fitted with a tension spline and the curvature along the tension spline is computed.

The techniques discussed above are representative of the quantitative and qualitative analyses which can be applied to the discrete features in the image after the boundaries of each feature have been defined. The system for implementing the method of the present invention is illustrated in FIG. 1. Microscope 10 develops an analog signal which is converted by converter 12 into a digital signal. Disk drive and cartridge tape drive 14 reads in and stores the digital image and also furnishes storage for the intermediate image data and for the computer programs used to manipulate the data. Data processor 16 defines the pore space by applying a classifier to the data represented by the color image, transforms the color image into a monochromatic image, and defines the boundary associated with each discrete feature in the image. Graphics processor 18 displays the image data as the data is evaluated.

The present invention furnishes an efficient method and system for defining the discrete features of porous solids such as sedimentary rocks, mineral samples, sintered metals, organic materials such as wood, and other porous compounds. The porosity of the solid is accurately measured by using a quadratic or linear classifier to analyze the color image. The discrete features of the solid are efficiently defined by transforming the color image into a monochromatic image before the details of the features are processed.

The above description of the present invention is merely illustrative and should not limit the scope of the invention. Modifications to the methods and system discussed above may be made without departing from the scope of the invention.

What is claimed is:

1. A method for analyzing the features of a digital image of a porous solid, comprising the steps of:
   (a) generating a digital color image of the solid, said digital color image consisting of a plurality of pixels, each pixel having a red coordinate, a green coordinate, and a blue coordinate;
   (b) processing the digital color image to identify pixels representing pore space;
   (c) generating a digital monochromatic image from the digital color image by (1) determining the brightness autocorrelation matrix for said digital color image, (2) determining the principal axis of said digital color image, said principal axis being the eigenvector of said brightness autocorrelation matrix having the highest eigenvalue, and (3) transforming each pixel into a quantity representing the projection of the pixel's red, green, and blue coordinates onto said principal axis; and (d) processing the digital monochromatic image to define the boundary of each discrete feature having a uniform brightness distribution.

2. A method as recited in claim 1, further comprising the step of calculating the porosity of the solid by dividing the total number of pixels identified as pore space by the total number of pixels.

3. The method of claim 1, wherein step (d) includes:
recursively subdividing the monochromatic image into successively smaller regions until each divided region has a uniform brightness distribution; and
merging adjacent regions having a uniform brightness distribution to form merged regions of a uniform brightness distribution which represent each discrete feature of the solid.

4. The method of claim 3, further comprising the step of:
determining the two dimensional size of each discrete feature by calculating the area within the boundary of the feature.

5. A method for analyzing the features represented in a two dimensional field of view of a porous solid which has been impregnated with a dyed compound, comprising the steps of:

generating an analog output signal with a microscope which scans the field of view of the solid;
converting the analog signal into a digital color image consisting of a plurality of pixels, each pixel having a red coordinate, a green coordinate, and a blue coordinate;
processing the digital color image to identify the pixels impregnated by the dyed compound;
generating a digital monochromatic image from the digital color image by determining the brightness autocorrelation matrix and principal axis of said digital color image, said principal axis being the eigenvector of said brightness autocorrelation matrix having the highest eigenvalue, and transforming each pixel of the digital color image into a quantity representing the projection of the pixel's red, green and blue coordinates onto said principal axis, so that said digital monochromatic image represents the brightness of the digital color image; and
processing the digital monochromatic image to define the boundary of each discrete feature having a uniform brightness distribution.

6. The method of claim 5, further comprising the step of calculating the area within each boundary defining a discrete feature.

7. The method of claim 6, further comprising the steps of:
identifying each discrete feature of the monochromatic image which represents a grain space; and
calculating the average area bounded by each feature identified as grain space.

* * * * *